United States Patent [19]

Nilsson

[11] Patent Number: 6,081,811
[45] Date of Patent: Jun. 27, 2000

[54] METHOD OF DATABASE CONVERSION INCLUDING DATA VERIFICATION

[75] Inventor: Ingvar Nilsson, Huddinge, Sweden

[73] Assignee: Telefonaktiebolaget LM Ericsson, Stockholm, Sweden

[21] Appl. No.: 08/795,928

[22] Filed: Feb. 5, 1997

[30] Foreign Application Priority Data

Feb. 8, 1996 [SE] Sweden .................................. 9600467

[51] Int. Cl.[7] ...................................................... G06F 17/30
[52] U.S. Cl. ........................ 707/201; 707/1; 707/100; 707/102; 707/202; 707/203
[58] Field of Search ................................ 707/112.3, 100, 707/101, 102, 200, 201–204

[56] References Cited

U.S. PATENT DOCUMENTS

| | | | |
|---|---|---|---|
| 5,278,978 | 1/1994 | Demers et al. .................. | 707/101 |
| 5,491,818 | 2/1996 | Malatesta et al. ............... | 707/201 |
| 5,499,359 | 3/1996 | Vijaykumar ..................... | 707/201 |

FOREIGN PATENT DOCUMENTS

| | | |
|---|---|---|
| 449494 | 10/1991 | European Pat. Off. . |
| 2-222044 | 9/1990 | Japan . |
| 5-35498 | 2/1993 | Japan . |
| 2270779 | 3/1994 | United Kingdom . |

OTHER PUBLICATIONS

International–Type Search Report re PCT/SE96/00126 Date of mailing of report: Dec. 13, 1996.
"*Technique to Convert a LAN Netview Start SQL Database into ASCII Database Files*", IBM Technical Disclosure Bulletin, vol. 36, No. 10 (Oct. 1993).
J. A. Dozier et al., "*Creating a Link Between Medical and Analytical Databases*", Proceedings of Computer Applications on Medical Care, pp. 479–482 (Nov. 1985).

*Primary Examiner*—Thomas G. Black
*Assistant Examiner*—Hosain T. Alam

[57] ABSTRACT

The present invention relates to a new database handling protocol for function changing of data from an old database (202) to a new database (204). The protocol solves those problems that occur when large quantities of data shall be converted from one database to another database. The new protocol is divided into different phases. A specification phase involves creating data which specifies the configuration of the new database (204). A declaration phase (A) involves creating conversion directives, writing these directives and inserting the directives into a conversion record storage block (208). A read-in phase (B) involves reading the conversion directives into an operating system (210). A read-out phase (C) involves reading data from the existing database into the operating system. A conversion phase (D) involves converting data in accordance with the conversion directives. An insertion phase (E) involves inserting converted data into the new database. The read-out, conversion and insertion phases are repeated until the whole of the database has been processed. The latter four phases are handled by the operating system (210). The new database is verified in a verification phase (F) to ascertain that the database is consistent.

12 Claims, 7 Drawing Sheets

6,081,811

METHOD OF DATABASE CONVERSION INCLUDING DATA VERIFICATION

FIELD OF INVENTION

The present invention relates to the database handling field and more specifically relates to a method of selectively changing the schema from an existing database to a new database.

DESCRIPTION OF THE PRIOR ART

A database or a computer archive functions as an information library where data can be stored, read, modified and erased. The database consists of one or more records which is or are described by a schema. The schema thus describes the logical and physical aspects of the database and consists of a number of items or entries. Each of these items includes one or more fields, headings, which disclose, among other things, the type of information that is stored in corresponding fields in respective records. Rules that limit the size of the fields are also stored in the schema, and also primary keys and foreign key relationships.

In a typical database system, it is possible to change both the schema itself and the limiting rules. These database systems are often constructed and administered with the aid of a standard database language, Structured English Query Language (SQL). SQL is not a full coverage programming language, but is used as a supplement for Pascal and $C_{++}$ among others.

SQL can thus define data structures, such as the aforesaid schema and limiting rules for instance, when handling a database, and is also able to define access methods. By access is meant such measures as read-out, storage, changes, deletions, etc., of data. These measures, or actions, are part of normal database handling procedures. Standard SQL includes the possibility of effecting set of operations, for instance the sum of a field taken over all variables or a field minimum, maximum. In some cases, it is necessary to effect a change outside those limits afforded by SQL, requiring the database to be closed down temporarily or, in other words, placed in a passive mode. Access is not allowed during an ongoing change, because the database must be in a steady state.

FIG. 1 illustrates by way of example how a function change is effected in a generally known database system 100. Although not shown in the Figure, there is included a computer system, e.g. a personal computer PC, a main computer or a telephone station. The known database system 100, illustrated schematically in FIG. 1a, makes a function change in the following way: An existing (old) database 102 co-operates temporarily with an application system 106. The application system 106 includes an application program with the aid of which data is read-in from the old database 102. Data is then modified by a conversion program, wherein data may be added or removed, and written into a new database 104. This is carried out in accordance with a known protocol 110, described in FIG. 1b, which is divided into an initiating phase 112 and a working phase 114.

The initiation phase 112 includes a specification of the new database 104 and also a declaration of data to the new database 104. The specification thus determines what the new database 104 shall look like, i.e. what its configuration shall be, what it shall contain and what can be done with the new database 104. A conversion directive is determined in the declaration, i.e. rules as to how conversion of data from the old database 102 to the new database 104 shall be carried out. The application program is also written in this phase. This program is written in SQL for instance, together with a value language. The application program puts the actual conversion into effect, which may be highly complicated in certain cases, particularly when function changes are to be effected in a large data base that contains many records.

The working phase 114 is carried out when the database system 100 is in a passive mode, and includes the following parts or sub-phases: Reading data from the old database 102, conversion, and verification and insertion. These parts, are also shown in FIG. 1a in accordance with the Roman numeral designations I–III. I. designates data read-out, in which one variable is read from the existing database 102 into the application program in the application system 106. This is effected with the commands SQL OPEN and SQL FETCH. II. designates conversion, wherein the variable that is read-out is converted to the format of the new database with the aid of the application program. III. designates verification+insertion, wherein verification, insertion and also activation of the variable to the new database 104 is carried out. By activation is meant SQL COMMIT. Whether or not activation can take place will depend on whether or not foreign key relationships have been correctly converted, for instance. An example of this is described on page 6 below. Activation can take place here or after having gone through the whole of the database. A check to ascertain whether or not the variable is correct is carried out in the verification phase, for instance that primary keys are unique. A check is then made to ascertain that the variable is consistent, and the variable is finally accepted. In order to avoid inconsistency, it is necessary to go through each record variable-for-variable until all records in the database have been gone through. It is sometimes necessary to carry out comprehensive transactions in order to manage full verification in large databases. A database transaction involves a change from one consistent state to another consistent state. An inconsistent state may well prevail therebetween. The transaction may also consist of several variables that are included in one and the same transfer packet to the new database 104. This means that several variables are read-in and converted before verification and insertion take place. This can cause problems in certain instances. For instance large resources are required in the case of large transactions. Insertion means that the variable is added to the new database 104. Activation renders the variable acceptable outside the transaction.

The type of problem that can occur when function changing is given by way of example below. Assume that an existing database, illustrated by the following record contains information relating to employees and their respective nearest manager in a company.

| EmpNo | Dept | NearestManager |
|-------|------|----------------|
| 345   | A    | 123            |
| 456   | A    | 123            |
| 567   | A    | 123            |
| 123   | A    | 234            |
| 234   | A    | —              |

The record illustrates a database, EMPLOYEES, with a number of records. Each record has several variables: EmpNo (employment number), Dept (department) and NearestManager (nearest manager). For each of the variables, the database schema contains, among other things, a domain which specifies permitted variable values: emp_no_dom, dept_dom and emp_no_dom, respectively. Each employee has no supervisor or one supervisor, and conversely each employee has no subordinate or several subordinates. In this case, EmpNo is the primary key and the foreign key relationship is NearestManager which nevertheless belongs to the database EMPLOYEES. This can be written in SQL as follows:

```
CREATE EMPLOYEES RECORD
    EmpNo emp_no_dom NOT NULL,
    Dept dept_dom NOT NULL,
    NearestManager emp_no_dom NULL,
    PRIMARY KEY (EmpNo),
    FOREIGN KEY (NearestManager) REFERENCES (EMPLOYEES)
        ON DELETE NULLIFY;
```

Assume that the company reorganises and all employees are to be given a new employment number. It is desired that the new database will have the following appearance or configuration subsequent to the conversion:

| EmpNo | Dept. | NearestManager |
|-------|-------|----------------|
| 1345  | A     | 1123           |
| 1456  | A     | 1123           |
| 1567  | A     | 1123           |
| 1123  | A     | 1234           |
| 1234  | A     | —              |

An attempt at variable-by-variable conversion in the known database system 100 will have the following appearance:

| EmpNo | Dept | NearestManager |
|-------|------|----------------|
| 1345  | A    | <u>1123</u>    |
| 456   | A    | 123            |
| 567   | A    | 123            |
| <u>123</u> | A | 234          |
| 234   | A    | —              |

The first variable will contain a foreign key relationship (underLINED) whose value has not been defined and the transaction will be rolled back. The foreign key relationship points quite simply to a non-existent variable.

In this general case, the problem has been solved by allowing the complete record to be included in one and the same transaction. This means that large resources are seized by the database system 100. The above reasoning can be generalised to apply to several records: When a transaction is implemented, the consistency of the database is checked by fetching in variables that are referred to through key relationships. If this is unsuccessful because the referent variable does not exist, the own transaction is analysed. Consequently, the analysis of large transactions will be time-consuming and therefore also the whole of the function change.

In order to circumvent these drawbacks, the conversion can be specified so that future referent variables are converted first. The analysis involved and the associated conversion program are highly complex.

U.S. Pat. No. 5,150,308 to Hooper, et al, describes the construction of a database that is related to an AI system, artificial intelligence.

U.S. Pat. No. 4,697,266 to Finely, describes a method of avoiding destruction of a database as a result of an unexpected interruption, system shut-down.

SUMMARY OF THE INVENTION

The problem concerned is that large resources can be seized in the database system when effecting function changes.

One object of the present invention is to reduce resource utilization, shorten conversion times and, at the same time, simplify the transmission of data from the existing database to the new database with the aid of a new database management protocol.

Another object of the present invention is to simplify the method of managing a database, this object being achieved by virtue of the fact that the user need not write an application program for transferring data from the existing database to the new database. All that is required is to declare conversion directive.

The present invention relates to a novel database management protocol for changing data from an old database to a new database. The novel protocol which lies in a new database system is divided into different parts, i.e. an initiating part, a working part and a verification part.

A specification and a declaration phase are included in the initiation part. The specification phase is comprised of the same work as that found in the existing database system 100, FIG. 1a. On the other hand, the declaration phase differs from the earlier protocol. The novel aspect involves creating and writing conversion directives which are then compiled to form conversion records. Conversion directives are written simply by specifying how data in the new database shall be generated on the basis of data from the old database 202. This is effected with the aid of FUSQL, for instance.

The working part includes a read-in phase, a read-out phase, a conversion phase and an insertion phase. An operating system is used to handle the various phases in the working part. The read-in phase involves reading conversion directives into the operating system from conversion records. There then follows the read-out phase, which involves reading data from the existing database to the operating system. There then follows the conversion phase which involves converting data in accordance with the specification and the conversion directives that are set up in the initiating part. Converted data is then inserted into the new database in the insertion phase. The procedure is repeated (read-out, conversion, insertion) until the whole of the data base has been processed. However, the configuration of the new database is unknown subsequent to a conversion having taken place. This means, for instance, that new non-initialised second choose indexes may have been added, and that control conditions that contain converted data have not been executed. This means, in turn, that the new database may be inconsistent. By this is meant that the existence of the undisturbed state of the database is not guaranteed, since primary keys may have been converted erroneously, for instance. Similarly, neither can foreign key relationships be guaranteed, since these may contain erroneously converted attributes. The new database is thus loaded with data populated) without being verified. This verification is carried out in the verification phase.

In the verification part, the verification phase, the new database is verified to ascertain whether or not it is consistent. For instance, tests are carried out on primary keys, value range indexes, foreign key relationships. Errors are also registered. When errors are detected, information to this effect is delivered and simpler errors are corrected automatically. The verification phase operates in co-operation with a database managing system (DBMS) and the new database.

One advantage with the aforesaid invention is that the database system is more user-friendly, since it is only necessary to produce conversion directives. All that the user need know is the appearance or configuration of the new database subsequent to function changes.

Another advantage of the present invention is that the new database is verified after having inserted data, meaning that checks carried out to ascertain the correctness of the new database subsequent to a function change are more effective.

Another advantage afforded by the invention is that a function change can be made more quickly than was previously the case, since the database system need only seize the minimum of resources, due to the fact that the new database is already constructed and that normal access paths can be used. It is possible to verify each variable in the most optimal manner afforded by the database system.

Another advantage afforded by the invention is that no dependency analysis is required, since the specification of the changes effected is fully declaratory.

Still another advantage afforded by the invention is that changes can be made in the database with the least possible influence on the database system.

Other advantages afforded by the invention include arbitrary changes that can be described and tested to enable function changes to be made more quickly, due to the fact that the database system need only seize the minimum of resources. This is because the new database is already constructed and because normal access paths can be used. Verification of each variable can be effected in the most optimal manner afforded by the database system.

The invention will now be described in more detail with reference to preferred embodiments thereof and also with reference to the accompanying drawings.

DETAILED DESCRIPTION OF PREFERRED EMBODIMENTS

Database management is found in many different places where data needs to be collected and/or stored. The illustrated embodiment refers to a telephone station, and more particularly to handling data in telephone databases. Naturally, the invention is not restricted to this field of database management but may be applied in any type of database whatsoever to enable data function changes to be made from one database to another.

Referring first to FIGS. 2–6.

Figure 1A:
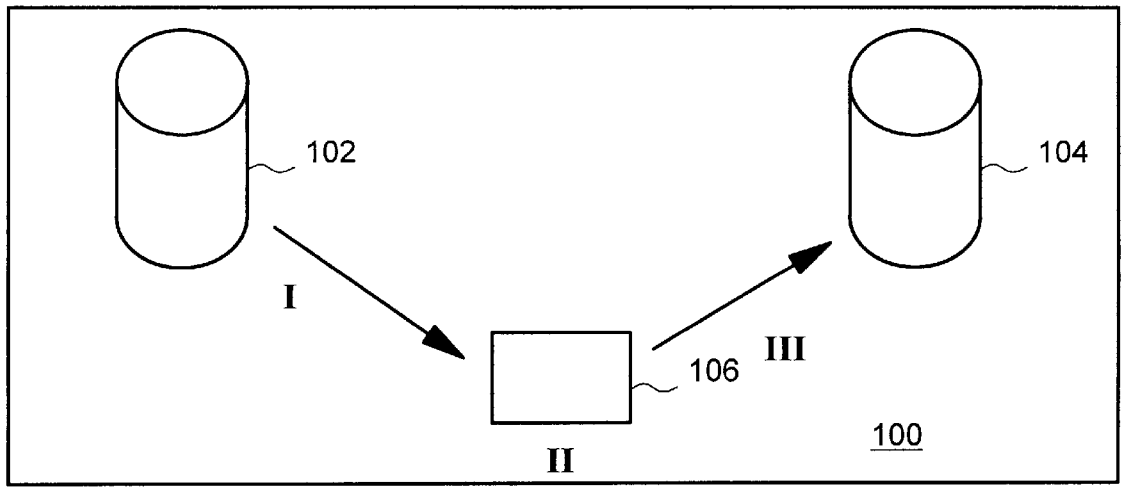
FIG. 1a illustrates an existing method of effecting a function change from one database to another.
Figure 1B:
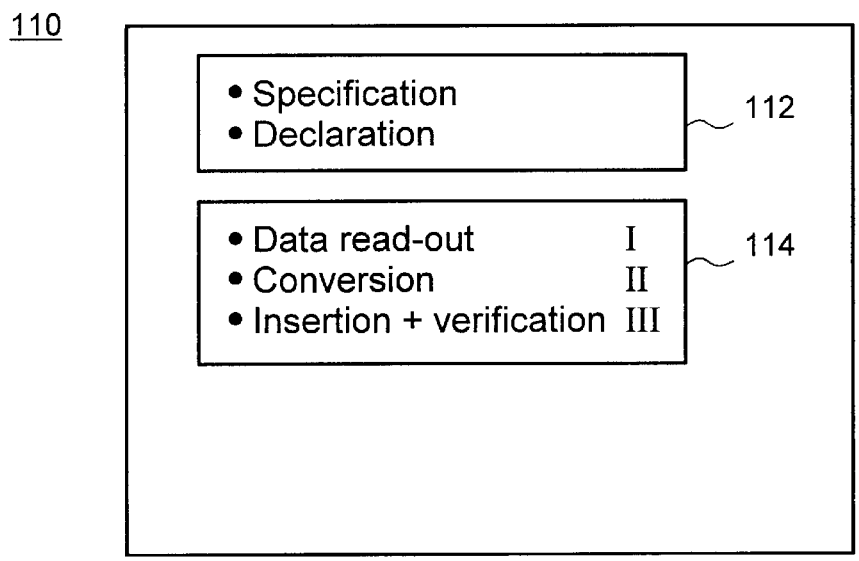
FIG. 1b illustrates an existing protocol conversion procedure step-by-step.
Figure 2:
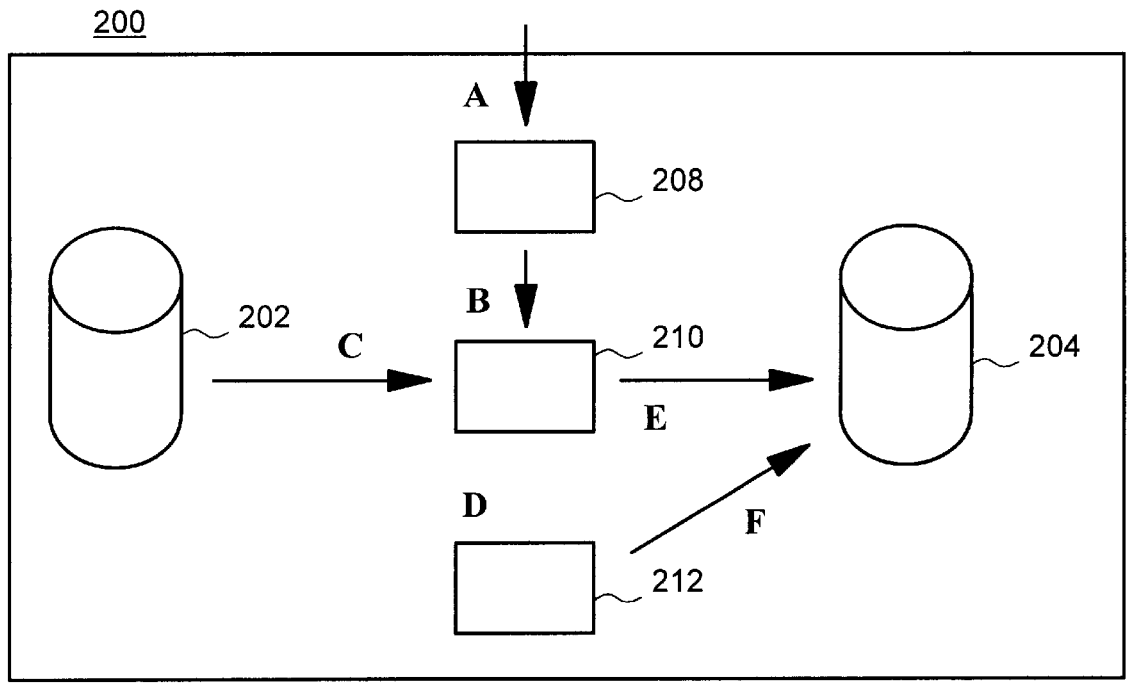
FIG. 2 is a block diagram illustrating a novel database system.

FIG. 2 is a block diagram illustrating a new database system 200, and gives a general structural picture of how the new database system 200 can operate. The Figure illustrates a novel method of making a new function change of an existing database 202 to a database 204 which is novel to the novel database system 200. The novel database system 200 comprises the existing database 202, the new database 204, conversion records 208, an operating system 210, and a database managing system (DBMS) 212. The existing database 202 may have precisely the same data content as the existing database 102 shown in FIG. 1a. The end result in the new database 204 is that content that one wished to reach in the old protocol but which was perhaps not possible due to the structure of the old protocol.

Figure 3:
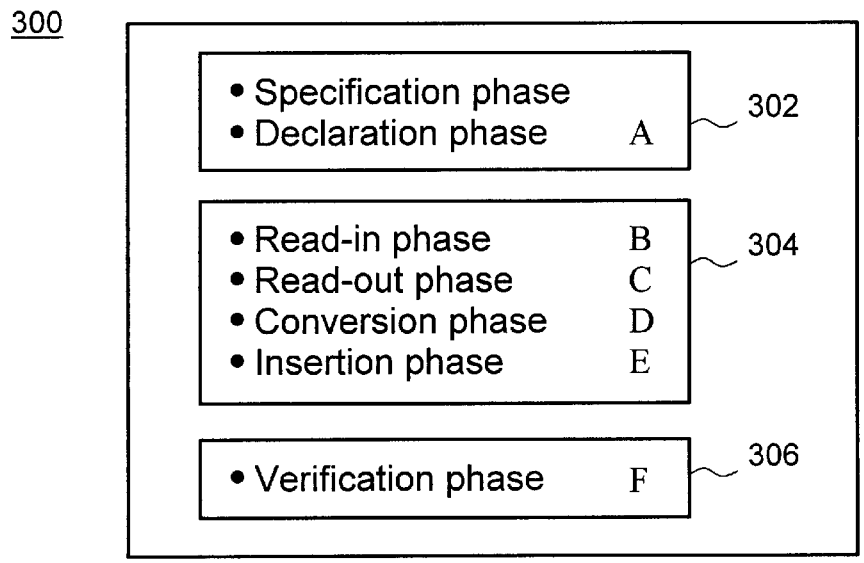
FIG. 3 illustrates a novel transfer protocol for the new function change.
Figure 4:
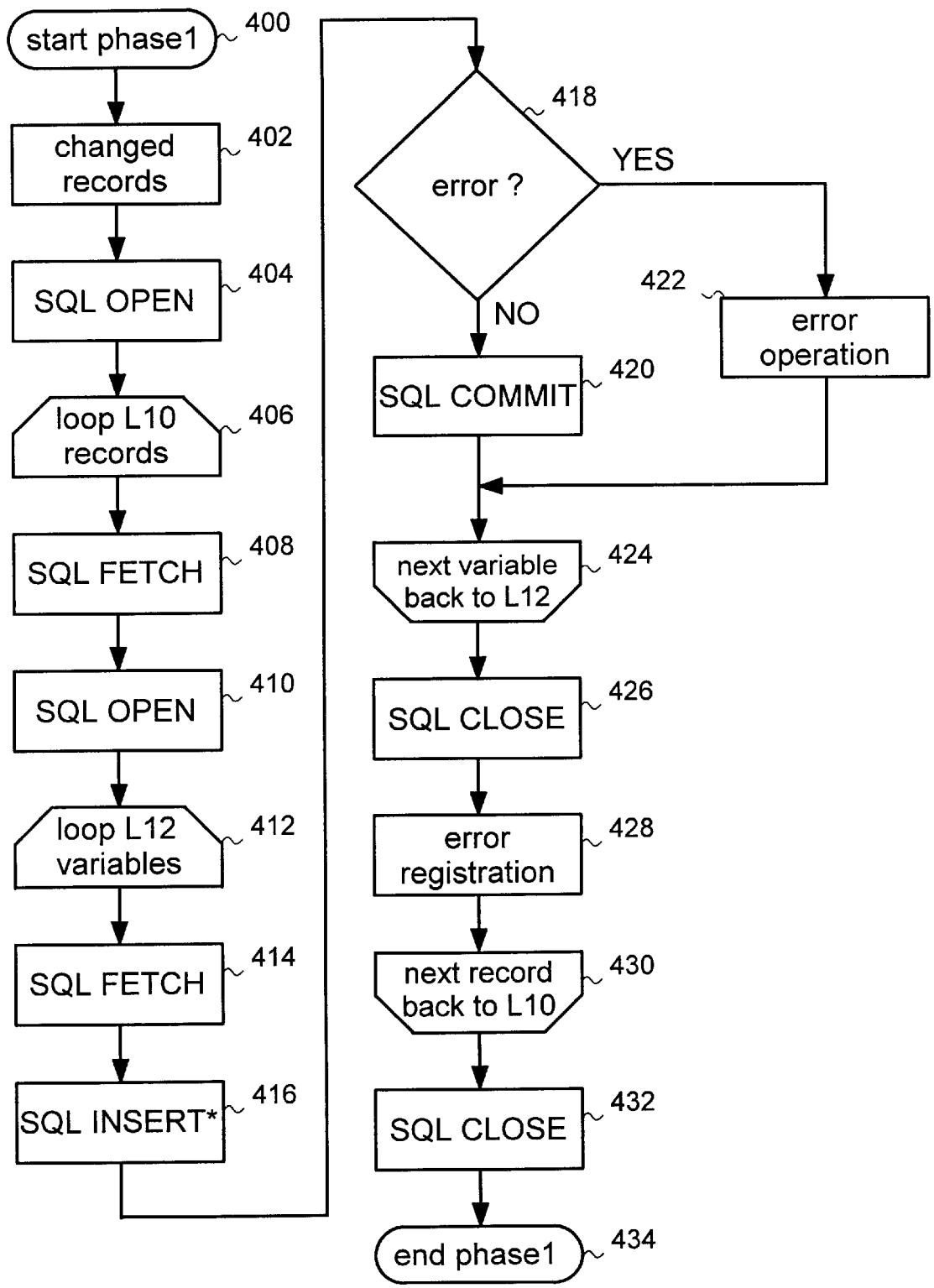
FIG. 4 is a flowchart illustrating a verification phase part 1.

FIG. 3 describes in detail a new protocol 300 for the new function change in the novel database system 200; c.f. also designations A–F in FIG. 2. The new protocol 300 is divided into three parts: a first part, e.g. an initiation part 302, a second part, e.g. a working part 304, and a third part, e.g. a verification part 306. The initiation part includes a specification and a declaration phase A. The appearance or configuration desired of the new database 204 is determined in the specification phase. The declaration phase A involves finding and writing-in conversion directives and then converting the directives to conversion records 208. The working part 304 is managed by the operating system 210 and includes the following phases: the read-in phase B, which involves reading conversion directives into the operating system 210 from conversion records 208. This phase is followed by the read-out phase C, in which data is read out from the existing data base 202 to the operating system 210. The next phase is the conversion phase D, in which data is converted in accordance with specifications and those conversion directives set-up in the initiation phase 302. Converted data is inserted into the new database 204 in an insertion phase E. The procedure (read-out, conversion, insertion) is repeated until the whole of the old database 202 has been processed. The verification part 306, the verification phase F managed by the database managing system (DBMS) 212 is divided into three phases; c.f. FIGS. 4–6 and associated text. This enables primary keys, foreign key relationships and value ranges to be checked, among other things.

FIGS. 4–6 describe the verification phase F, which is divided into three phases. The SQL command has been used when possible to illustrate the verification phase procedure in respect of the new database 204.

FIG. 4 describes in a first flowchart how phase 1 of the verification phase functions, step-by-step. The flowchart beings with a block 400 "start phase 1", which is followed by a block 402 "changed records" i.e. records in which a change has been made. There then follows in sequence a block 404 "SQL OPEN", a block 406 "loop L10 records" and a block 408 "SQL FETCH". There then follows a further block 410 "SQL OPEN". These blocks are followed by block 410 "loop L12 variables" and a block 414 "SQL FETCH". The next blocks are block 416 "SQL INSERT" and block 418 "error?". If no errors have occurred in the illustrated case, block 420 "SQL COMMIT" is effected. When errors have occurred, block 422 "error operation" is carried out. Block 420 or block 422 is followed by block 424 "next variable back to L12" and block 426 "SQL CLOSE". Registration of what has happened in the record i.e current record appearance is effected in block 428 "error registration" followed by block 430 "next record back to L10". These blocks are followed by block 432 "SQL CLOSE", and the last block 434 in the first flowchart "end of phase 1".

Figure 5A:
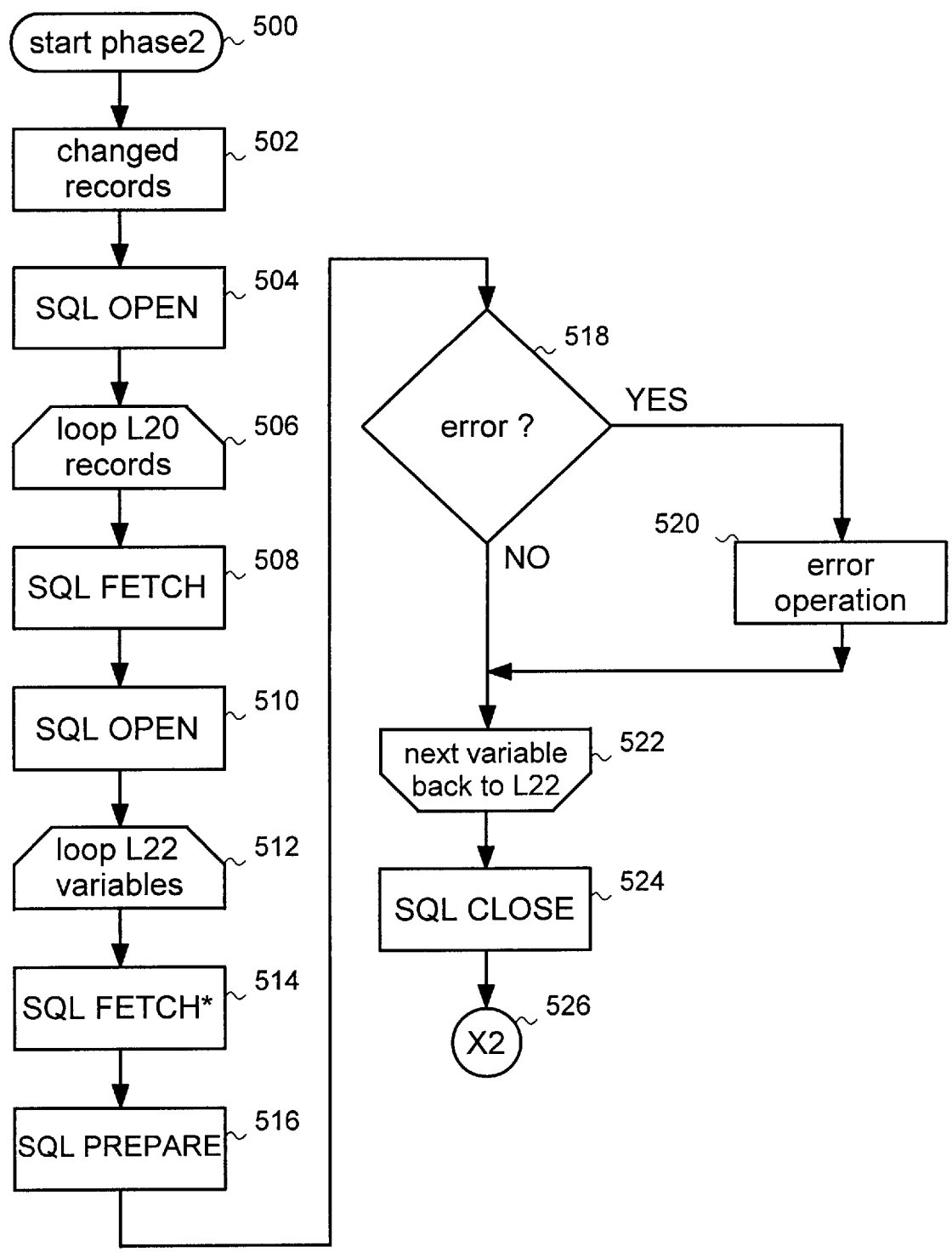
FIG. 5a is a flowchart illustrating a verification phase part 2.
Figure 5B:
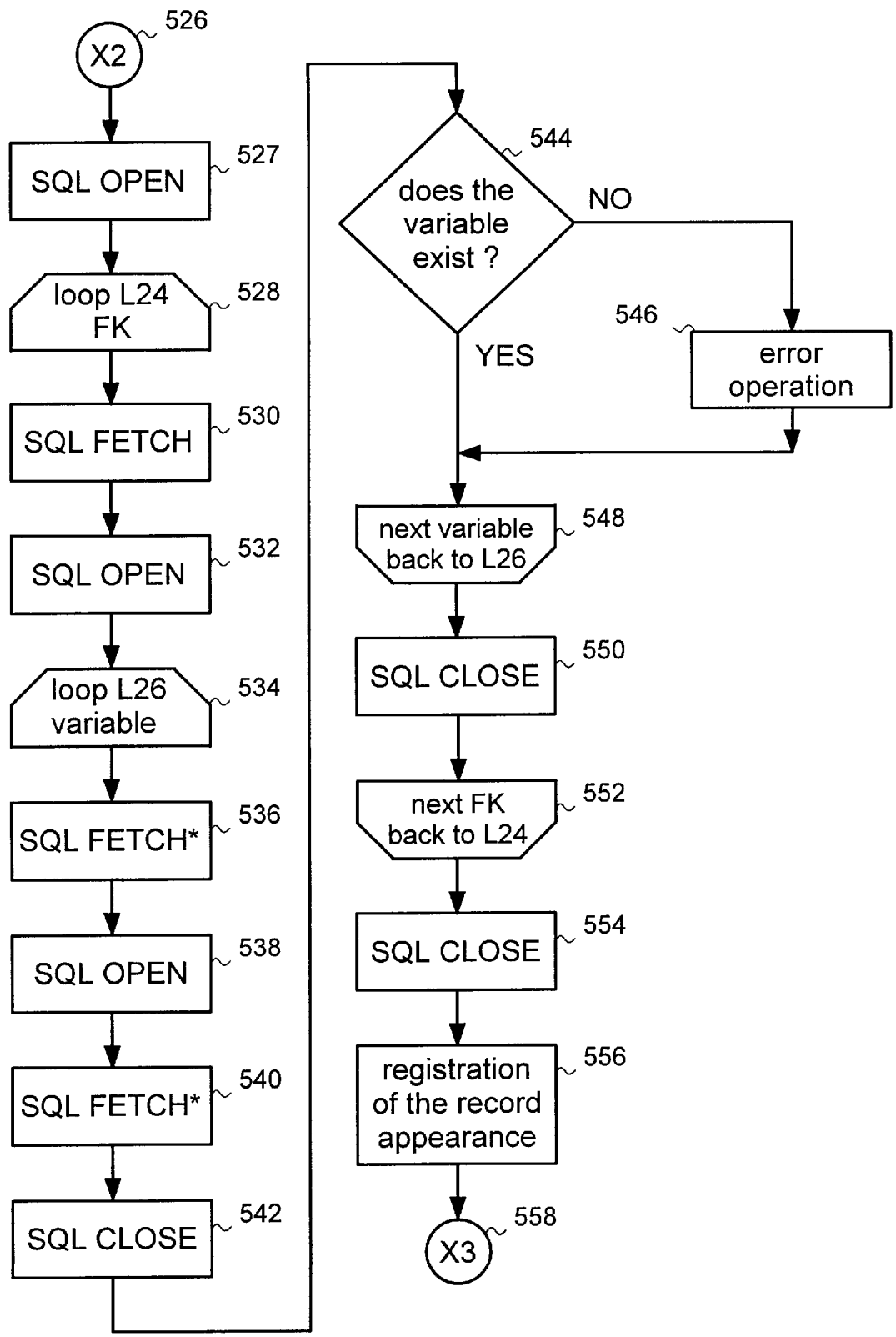
FIG. 5b is a continuation of the flowchart of the verification phase part 2.
Figure 5C:
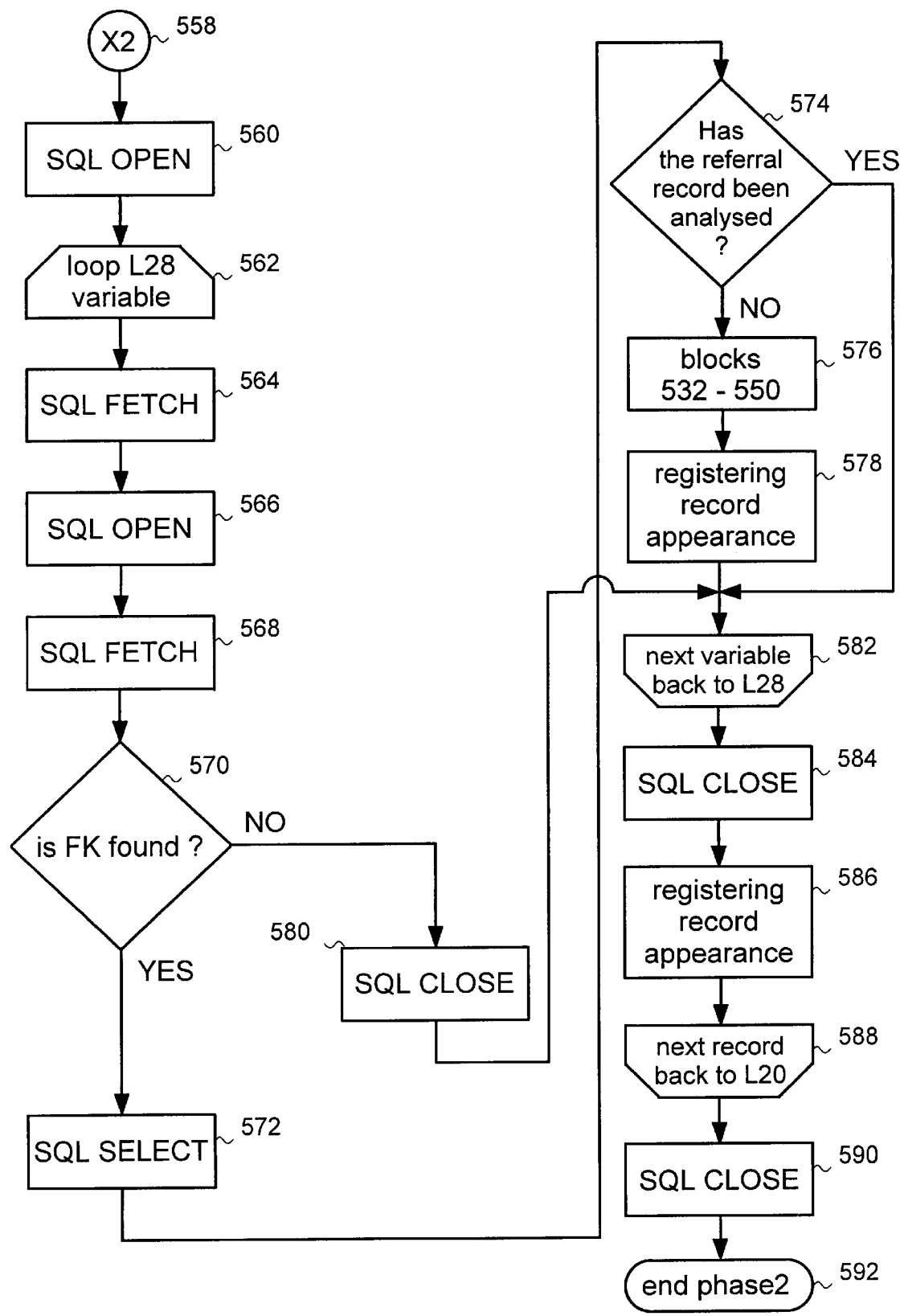
FIG. 5c is a further continuation of the flowchart of the verification phase part 2.
Figure 6:
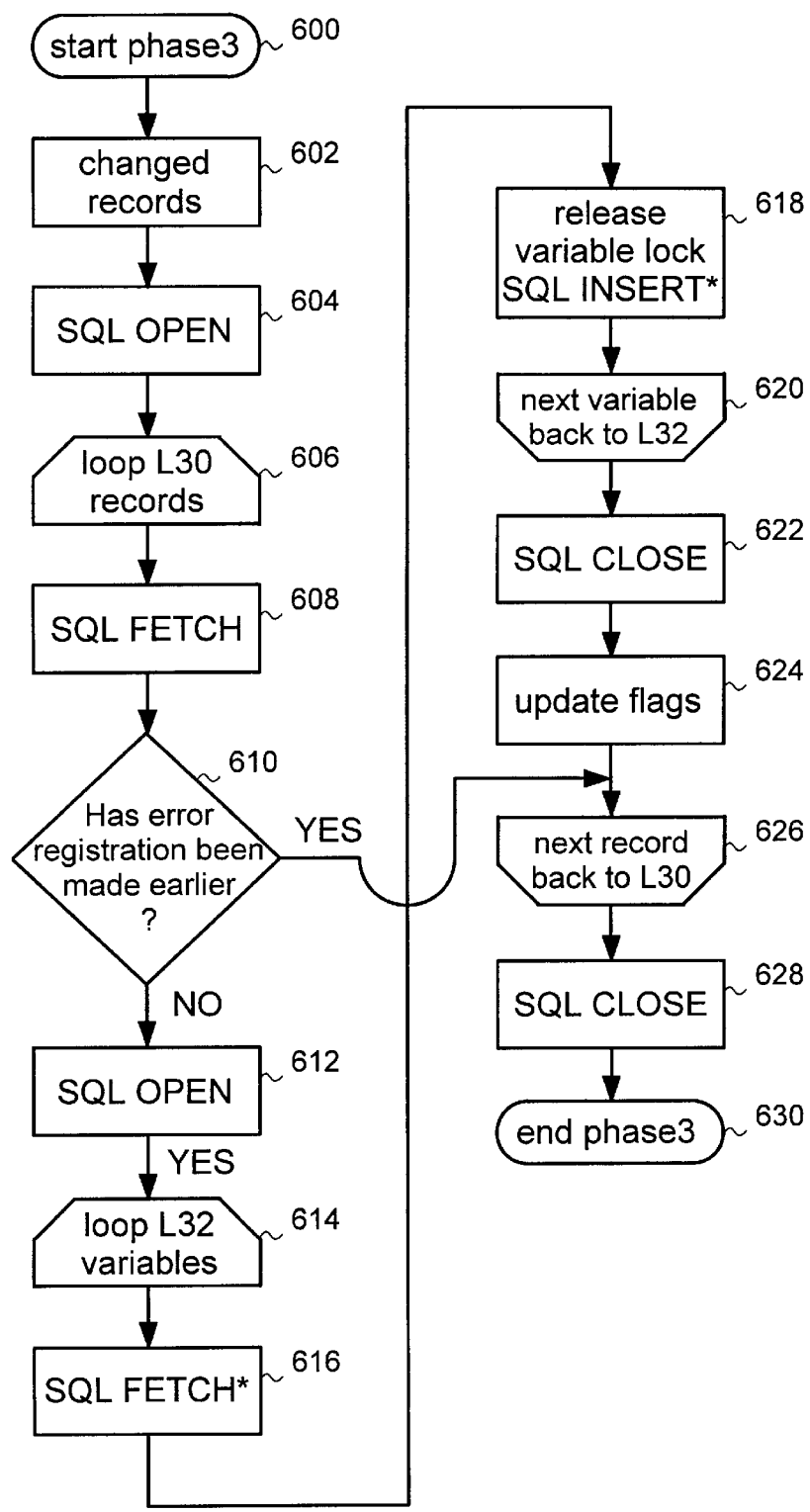
FIG. 6 is a flowchart illustrating a verification phase part 3.

FIG. 5 describes a second flowchart showing how phase 2 of the verification phase is carried out. The flowchart begins with block 500 "start phase 2" (see FIG. 5a) whereafter there follows block 502 "changed records", and block 504 "SQL OPEN". There next follows block 506 "loop L20 records" and a further block 508 "SQL FETCH". These blocks are followed sequentially by block 510 "SQL OPEN", block 512 "loop L22 variables" and block 514 "SQL FETCH". The next block is block 516 "SQL PREPARE", followed by block 518 "error?" and block 520 "error operation". If an error occurs, block 522 "next variable back to L22" is carried out and when no error has occurred, block 524 "SQL CLOSE" is carried out. There then follows block 526 "X2" (see FIG. 5b) followed by block 527 "SOL OPEN" and block 528 "loop L24 FK" and then block 530 "SQL FETCH". The next block 532 "SQL OPEN" is followed by block 534 "loop L26 variable" and block 536 "SQL FETCH*" and block 538 "SQL OPEN" then follow. There then follows block 540 "SQL FETCH*", block 542 "SQL CLOSE" and block 544 "does the variable exist?". When the variable exists, the YES response, block 548 "next variable back to L26" is carried out and thereafter block 550 "SQL CLOSE". If no variable exists, the NO response, block 546 "error operation" is carried out and block 548 "next variable back to L26". Block 552 "next FK back to L24" is carried out after block 550. There then follows block 554 "SQL CLOSE" and block 556 "registration of the record appearance". There then follows block 558 "X3" (see FIG. 5c) and thereafter block 560 SQL OPEN and block 562 "loop L28 variable". The next block to follow is block 564 SQL FETCH and block 566 SQL OPEN, and thereafter block 568 SQL FETCH and query block 570 "is FK found". When the response to the query raised in block 570 is YES, there then follows block 572 SQL SELECT. There now follows block 574 which raises a further query "has referent record been analysed?". If the response is NO, block 576 "blocks 532–550", is carried out, followed by block 578 "registering record appearance and thereafter block 582 "next variable back to L28". When the response is NO in block 570 "is FK found?", block 580 SQL CLOSE is implemented, and a further step is carried out in block 582 "next variable back to L28". When the reply to the question "Has referral records been analysed" in block 574 is an affirmative YES, block 582 "next variable back to L28" is effected. The next following step is SQL CLOSE, block 584, followed by registering the appearance of the record", block 586. The next step is "next record back to L20", block 588. Phase 2 is terminated by SQL CLOSE and hereby ends phase 2, block 592.

FIG. 6 describes in a third flowchart how verification of phase 3 is achieved. The FIG. 6 flowchart begins with a first block 600 "start phase 3", followed by block 602 "changed records" and block 604 "SQL OPEN". These blocks are followed by block 606 "loop L30 records", block 608 "SQL FETCH", and block 610 "Has error registration been made earlier?". If the response is NO, block 612 "SQL OPEN". block 614 "loop L32 variables", block 616 "SQL FETCH" and block 618 "release variable lock, SQL INSERT®" are then carried out. Blocks 620 "next variable back to L32" and block 622 "SQL CLOSE" are then carried out. The next following block 624 effects "updating flags". There then follows block 626 "next record back to L30", which also follows block 610 when the answer to the query "have errors been registered earlier" is YES. The flowchart is ended with block 628 "SQL CLOSE" and block 630 "end phase 3".

The manner in which a function change, change of information, is effected from the existing database 202 to the new database 204 (see FIG. 2) in order to achieve the given end result will now be described in more detail. The new protocol contains the following phases (see FIG. 3): specification phase, declaration phase A, read-in phase B, read-out phase C, conversion phase D, insertion phase E and verification phase F. It will be understood that the order of the phases may change, since said phases are not bound to the afore-proposed sequence. The described phase sequence is the best sequence with regard to this embodiment. In the present case, verification has been described with reference to the SQL command, although this is not absolutely necessary since other database management languages may alternatively be used.

There is set-up in the specification phase a schema describing how the new database 204 shall be configured. There are determined in this respect those rules that shall be used, etc., for inserting and erasing data. This phase is the same as that of the old protocol and is declaratory in SQL-DDL (SQL Data Definition Language).

The intended configuration of the new database is declared in the declaration phase. Conversion directives are also compiled and written-in, meaning that rules that govern how data shall be converted are created. The rules governing how data shall be generated from the old database 202 to the new database 204 are specified in conversion directives. The new conversion directives are compiled in the form of conversion records 208.

The read-in phase involves reading conversion records into the operating system 206, FIG. 2. The operating system 210 manages the read-in phase, the read-out phase, the conversion phase and the insertion phase.

In the read-out phase, old data is fetched from the existing database 102 and inserted into the operating system 210.

In the conversion phase, old data is converted with the aid of conversion directives or conversion terms and data for the new database 204 is generated.

The new data values are inserted in the insertion phase so as to populate the database, thus all data values will lie in the new database 204. On the other hand, no verification of the new database 204 has been carried out. This verification is effected in the verification phase. The database may well be inconsistent after the insertion phase.

All tests relating to the consistency or inconsistency of the database are carried out in the verification phase, which is managed by the database managing system 212. In turn, the verification phase is divided into several different phases. The database change function deals with verification of the new database 204 subsequent to a function change having been made, where data has been converted or new search indexes have been defined.

Information which relates to those records that are to be checked and to the types of checks to be carried out is constructed. The verification phase carries out integrity checks, and among other things primary key tests, value range tests and foreign key relationship tests.

The manner in which the verification phase functions will now be described step-by-step with the aid of the SQL command, among other things. The verification phase is divided into three phases having different sub-phases, these sub-phases being divided so as to enable the sub-phases to be placed in a sequence different to that illustrated here.

The verification phase 1 (FIG. 4) commences with the start phase 1. There is first read a system file that contains metadata relating to the records of the system. The block includes, among other things, information relating to those changes that have been made The system file has been constructed in conjunction with defining the new database SQL OPEN is used to open the system file with metadata, data about data. SQL OPEN sets up search conditions for reading metadata concerning all records where a change has been made in the new database 204. SQL OPEN is a standard operation which commits the search condition and positions an item pointer. Loop L10 of records now begins, wherewith phase 1 takes the first record from the system record and thereafter following records until all changed records in the system have been gone through. The command SQL FETCH executes the search condition that has been set-up by SQL OPEN. In this case, the first record that fulfils the condition is fetched. The next time SQL FETCH is executed, the next record that fulfils the condition in SQL OPEN is fetched. In this case, SQL OPEN results in the setting-up of search conditions for reading with the aid of a linear search of all variables in the changed record. Loop L12 of variables in the record now commences, wherewith phase 1 takes the first variable and thereafter the next variable until all variables in the record have been gone through. SQL FETCH executes the search condition that is set-up with SQL OPEN, for a changed record, resulting in a variable being fetched. The next time SQL FETCH is executed, the next variable is fetched. There is used in accordance with the invention a special SQL command, SQL INSERT*, which is created particularly for this situation. Thus, SQL INSERT* will not insert any data in the variable, since data has already been inserted, but executes verification, i.e. a test which determines that no variable having the same value as the primary key. is found in the record. The variable is then locked and an error test carried out. When no error has occurred, SQL COMMIT is executed, therewith confirming what have happened with regard to the new variable, i.e excecutes the new variable. SQL COMMIT involves updating of search functions, access functions. If an error has occurred when SQL INSERT* is used, a comprehensive error registration is carried out. When an error occurs, it means that the conversion directive is erroneous. An erroneous variable is eliminated after either SQL COMMIT or when the error registration in loop L12 is terminated, which means that a return to the beginning of loop L12 is made until all variables in the record have been examined. SQL CLOSE is used to close the changed record. There then follows a registration of the record appearance, which involves inserting a marker in the system file. The following records are then returned to loop L10 until the last record in the system record set-up has been processed. The system file are closed in phase 1 by executing SQL CLOSE. Phase 1 is thus ended and all search functions updated.

The verification phase 2 in the FIG. 5 flowchart is commenced by starting phase 2. Firstly, the system record is read, this record being the same system record as that in phase 1, and contains metadata relating to the system blocks and, among other things, disclosing those changes that have been made. SQL OPEN is then used to open the system record with metadata; c.f. phase 1, block 404.

A first following sub-phase carries out value range tests, among other things. The next step commences with a loop L20 of records, in which each record where a change has earlier been made will be gone through, in accordance with data from the system record. The next step uses an SQL FETCH command for reading record-related data from the system file when a change has been made. In the following steps, SQL OPEN is used to open the record in which a change has been made. Compare this with phase 1 in block 408. The next step commences with a loop L22 of variables in which a first variable in the record is fetched forward. Thus, in phase 2, the first variable is fetched and thereafter the next variable and so on until all variables in the record have been gone through. This is effected with SQL FETCH*. The variables are accessible because SQL FETCH* although observing that the variable is locked, reads the variable nevertheless. Locked variables cannot be read in normal SQL FETCH; compare with phase 1, block 408. There then follows SQL PREPARE, in which checks are made relating to index validity and to whether or not the value range coincides with the rules that have been set-up. In the next step, a query "has an error occurred in SQL PREPARE?" is raised. If an error has occurred in SQL PREPARE, an error registration is made; see block 422. If no error has occurred after executing SQL PREPARE, there is executed a last step in loop 22 in which phase 2 goes to the next variable in the record and continues until the last variable in the record has been processed. There then followed a further step using SQL CLOSE with which the changed record is closed. The sole purpose of block X2 is to enable the flowchart to be continued on the following page.

The next sub-part tests outgoing references, foreign key relationships and their validity. Search conditions are set-up for finding a referent record indicated by the foreign key relationship. The next step is commenced by opening the referent record, SQL OPEN, set-up by the search condition. There is then executed a foreign key relationship (FK) loop L24, wherewith the first referent record is fetched. This means that phase 2 fetches the first record in which a change has been made, followed by the next changed record and so on, until all changed records have been gone through. The process includes a further step SQL FETCH in which data relating to the referent record is read, therewith causing foreign key relationships to be read. In those cases where foreign key relationships are found to be read, this is effected with SQL OPEN, meaning that the referent record is opened. Search conditions are set-up so that the record to which foreign key relationships point will open variables for reading. The next step is loop L26 of variables in the referent record, meaning that phase 2 reads the first variable in said record and thereafter the next changed referent variable and so on, until all referred variables in the referred record have been gone through. Loop 26 includes the following steps: The referent variable in the referent record is fetched with the aid of SQL FETCH*. The read data includes the value of the foreign key relationship. This value constitutes the search condition in the referent record. The condition is transferred with SQL OPEN. A variable that fulfils the condition is fetched with SQL FETCH*, whereafter the referent record is closed with SQL CLOSE. The query "does the variable exist?" is raised in the next step. When the variable referred to does not exist, the foreign key relationship points to a variable which does not exist and an error registration is made; see block 422. When the variable referred to does exist, or after rectifying an error, the next step termination of loop L26 is executed. In this step, loop L26, the next variable referred to is processed in the referent record until the last variable referred to in the changed referenced record is processed, There then follows SQL CLOSE, which is used to close the changed referent record. After SQL CLOSE, or when no foreign key relationship is found, there follows a step in which loop L24 is terminated. This means that the next foreign key relationship is read from the system record. Subsequent to processing all variables in the changed record. There follows the step SQL CLOSE which closes the changed record. The appearance of the record is also registered. The block X3 is solely intended to enable the flowchart to be continued on the next page.

The following sub-part will then test incoming references, foreign key relationships and their validity. The system file containing metadata relating to system blocks is opened with SQL OPEN. All changed files will be analysed. The next step commences with a loop L28 of records, wherein each record that includes an incoming reference will be gone through in accordance with data from the system file Changed records are fetched with SQL FETCH. The data read is input data to a new question to another system file that contains foreign key relationships. This block is opened with SQL OPEN for fetching the foreign key relationship, wherein the analysed record is included as a referent record fetched with SQL FETCH. The question "is FN found?" is then asked. If the answer is YES, a foreign key relationship is found, data is fetched with SQL SELECT, meaning that data relating to the referent record is collected from the system file having record data. A further question "has the referent record been analysed" is then asked. If the relationship has not been analysed, the answer is NO and a test is run on outgoing references in the same manner as in blocks 532–550, followed by registration of the appearance of the record and thereafter the next record loop L28. When the answer to the question "is FK found" is NO, SQL CLOSE is executed so as to close the records with foreign key relationships, whereupon the next record is returned to loop L28 and therewith analysed. If the answer to said question is YES, the referent record has been analysed, the following step is executed, this step being the next record loop L28 since the relationship was analysed in an earlier step. The next step is SQL CLOSE, which is used to close the system file having a foreign key relationship. The appearance of the record is then registered. The next step involves passing to the next record in the system record, end of loop L20. The loop L20 is executed until the last record in the record setup has been processed and the system file are closed finally with the aid of SQL CLOSE. Phase 2 is herewith terminated.

The verification phase part 3 (FIG. 6) is introduced by starting phase 3. The system file is first locked, this system file being the same as in phase 1 and containing metadata relating to the records of the system and, among other things, information relating to those changes that have been made, in order to be able to execute the verification phase 3. Compare with block 402. SQL OPEN is then used to open the record containing metadata. Compare with block 404. The next step begins with a loop L30 of records, meaning that each record in which a change has been made will be gone through until the last record has been processed. Loop L30 includes the following steps. Data relating to records in which a change has been made are read sequentially with the aid of SQL FETCH. Compare block 408. In the next step, a question "has error registration been made earlier?" is asked, i.e. has the registration of errors been made earlier in phase 1 and phase 2. If the response to this question is NO, SQL OPEN is executed. Compare with Alan block 414. This results in the record being opened. The next step begins with loop L32 of variables, wherein phase 3 takes the first variable in the record and then the next variable and so on until all variables in the record have been gone through. SQL FETCH* involves reading data from variables in the record. Compare block 514. The last step in loop L32 is to release the variable lock that has earlier been set with SQL INSERT*; see phase 1. Loop L32 terminates here, meaning that phase 3 returns to the next variable in the record and so on until the last variable has been dealt with. There then follows a step with SQL CLOSE, which closes the changed record and whereupon flags are updated, meaning that the information found in the system file relating to the changes made is added, removed or updated. If the answer to the question "has error registration been made earlier?" is YES, this means that error registration has previously been made in phase 1 or in phase 2 and that flags shall not be updated. There then follows the next record that has earlier been brought forwards in block 602 in the phase 3. The loop is through-passed until the last record has been processed and the system files are finally closed with the aid of SQL CLOSE. Phase 3 is herewith terminated.

Error Processing

Upon completion of the conversion and insertion of data, a check is made to ascertain whether or not the database is consistent. The verification phase carries out a first check to ascertain that all indexes used by the database system are constructed of primary keys, for instance. Any errors, such as double primary keys, are registered. Subsequent to having compiled all search indexes, a check is made to ascertain that foreign key relationships and remaining limited rules (restrictions) are fulfilled. An example of remaining limiting rules is one in which an attribute may have a max-value. When the whole of the database has been verified, there is delivered a message that discloses the result and any error information. The database may have the following configuration after step E.

| EmpNo | Dept | NearestManager | |
|-------|------|----------------|---|
| 1345  | A    | 1123           |   |
| 1456  | A    | 1123           |   |
| 1567  | A    | 1123           |   |
| 1123  | A    | 1234           |   |
| 1234  | A    | —              |   |
| 1345  | C    | 1123           | ! ERROR NO. 1, DOUBLE PK! |
| 1789  | C    | 1999           | ! ERROR NO. 2, UNDEFINED FK ! |
| 0000  | C    | 1123           | ! ERROR NO. 3, INVALID PK ! |

Error number 1 will be discovered when constructing an access support. Error number 2 will be discovered when checking foreign key relationships. Error number 3 will be discovered when checking restrictions.

Other embodiments are described below:

Function change from at least two old databases to a new database.

Function changes from an old database to at least two new databases.

Function change of distributed databases, for instance at least two old databases to at least two new databases.

It will be understood that the invention is not restricted to the aforedescribed and illustrated exemplifying embodiments thereof, and that modifications can be made within the scope of the following Claims. SQL INSERT* can be modified so as not to set locking bits. In this case, SQL FETCH need not be modified. It has earlier been mentioned that it is not necessary to use the database language SQL and that other database languages may be used equally as well.

I claim:

1. A method of database conversion in a database system comprising the steps of:

creating specifications that specify a configuration of a new database in comparison with an existing database, converting data from the existing database and installing this data in the new database in accordance with said specifications;

verifying the new database, wherein checks are carried out to determine whether the new database is consistent, including using a command which initiates a test to determine whether a primary key value is associated with only one variable in each record.

2. A method according to claim 1, wherein said step of verifying the new database further comprises: primary key tests, foreign key relationships tests and value range tests when the new database is verified.

3. A method according to claim 1, wherein said command is an SQL INSERT command which locks a variable, wherein the command also enables the variable to be read at a later time despite a lock having been placed on the variable.

4. A method according to claim 3, comprising an SQL FETCH command, for reading data from the locked variable when the new database is verified.

5. A method of database conversion in a database system comprising:

an initiation part, which includes:
the step of creating specifications that specify a configuration of a new database in comparison with an existing database; and
the step of creating and writing conversion directives which are then placed in conversion records;
a working part including the steps of:
reading conversion directives into an operating system from the conversion records,
reading data from an existing database and installing said data in an operating system,
converting said data in accordance with the specifications and the conversion directives, and
inserting converted data into the new database; and
a verification part including the step of:
verifying of the new database managed by a database managing system which checks the consistency of the new database.

6. A method according to claim 5, wherein said verification part includes the step of:
performing primary key tests, foreign key relationship tests and value range tests.

7. A method according to claim 5, wherein said verification part includes an SQL INSERT command, which carries out a test to ascertain whether only one primary key is found in each record, whereafter a lock is placed on a variable, wherein the command also enables the variable to be read at a later time despite the variable being locked.

8. A method according to claim 7, wherein said verification part includes an SQL FETCH command, for reading data from locked variables.

9. A method of database conversion in a database system comprising:

a specification phase, including creating specifications which specify a configuration of a new database in comparison with an existing database;
a declaration phase including creating and writing conversion directives and placing said directives in conversion records;
a read-in phase, including reading conversion directives from the conversion records into an operating system;
a read-out phase, including reading data from an existing database into the operating system;
a conversion phase, including converting data in accordance with the specifications and the conversion directives;
an insertion phase, including inserting converted data into the new database; and
a verification phase which is managed by a database managing system which checks the consistency of the new database.

10. A method according to claim 9, wherein the verification phase performs primary key tests, foreign key relationship tests and value range tests.

11. A method according to claim 9, wherein said verification phase includes an SQL INSERT command, which checks whether only one primary key is found in each record, whereafter a lock is placed on a variable, wherein the command also enables the variable to be read at a later time despite a lock having been placed on the variable.

12. A method according to claim 11, wherein said verification phase includes an SQL FETCH command, to enable data to be read from locked variables.

* * * * *